United States Patent [19]

Barcza

[11] Patent Number: 5,215,256

[45] Date of Patent: Jun. 1, 1993

[54] FLAP HINGE ARRANGEMENT FOR A CONVERGENT/DIVERGENT NOZZLE

[76] Inventor: W. Kevin Barcza, 6664 SE. Silverbell Ave., Stuart, Fla. 34997

[21] Appl. No.: 914,289

[22] Filed: Jul. 16, 1992

[51] Int. Cl.[5] .......................... F02K 1/02; B04C 15/06
[52] U.S. Cl. .............................................. 239/265.39
[58] Field of Search ............... 239/265.19, 265.41, 239/265.33–265.39, 587.5, 587.6; 60/228, 230, 231; 249/12.5, 23 D

[56] References Cited

U.S. PATENT DOCUMENTS

| | | | |
|---|---|---|---|
| 4,176,792 | 12/1979 | McCardle, Jr. ................ | 239/265.41 |
| 4,994,660 | 2/1991 | Hauer .............................. | 239/265.41 |
| 5,039,014 | 8/1991 | Lippmeier ....................... | 239/265.39 |
| 5,076,496 | 12/1991 | Lippmeier ....................... | 239/265.41 |
| 5,082,182 | 1/1992 | Bruchez, Jr. et al. ......... | 239/265.35 |

Primary Examiner—Andres Kashnikow
Assistant Examiner—Kevin P. Weldon
Attorney, Agent, or Firm—Edward L. Kochey, Jr.

[57] ABSTRACT

A divergent flap hinge seal for a thrust vectoring nozzle is pivotally connected to the convergent flap, and the divergent flap is pivotally connected to this flap hinge seal An extension on the hinge seal sealingly overlies a recess in the divergent flap. The flap hinge seal is connected to the convergent flap by two pins and the divergent flap is connected to the flap hinge seal by a pin.

10 Claims, 3 Drawing Sheets

FLAP HINGE ARRANGEMENT FOR A CONVERGENT/DIVERGENT NOZZLE

The Government has rights in this invention pursuant to a contract awarded by the Department of the Air Force.

DESCRIPTION

1. Technical Field

The invention relates to gas turbine engines and in particular to vectorable discharge nozzles therefor.

2. Background of the Invention

Gas turbine engines for aircraft achieve thrust by discharging hot gases through the exhaust nozzle. Efficient operation for multi-mission application dictates the use of variable area convergent/divergent nozzles.

Variable convergent/divergent configuration is achieved in axisymmetric nozzles by the use of a plurality of circumferentially arranged flaps. Overlapping seals are located between adjacent flaps.

The hinge arrangement must be provided between each convergent flap or seal and each divergent flap or seal. Variations may be made during operation, of the throat and terminal discharge openings.

Increased maneuverability of the aircraft can be accomplished by thrust vectoring. Here the discharge of gas is vectored from the axial direction to achieve a thrust component which is up, down or sideways. As shown in U.S. Pat. No. 5,082,182 (Bruchez et al, issued Jan. 21, 1992) the vectoring may be accomplished by vectoring movement of the divergent flaps and seals only. The convergent flaps and seals remain symmetrical. The hinges between the convergent and divergent flap must be capable of rotation around both the radial axis and lateral axis of the hinge. The hinge must also maintain a seal at all times to prevent leakage of the hot gas stream and loss of thrust.

Cooling air is discharged along the surface of the convergent nozzle, passing through the throat to the divergent nozzle. The hinge must neither significantly affect the geometry of the nozzle throat nor block the cooling flow from the convergent nozzle.

SUMMARY OF THE INVENTION

The convergent flap and a divergent flap hinge seal are connected by a first pivotal connection with an axis parallel to the surface of both the convergent flap and the divergent flap hinge seal. The divergent flap having its gas side surface coplanar with the gas side surface of the hinge seal is connected to the hinge seal by a second pivotable connection. This second connection has its axis perpendicular to the surfaces of the divergent flap and the divergent flap hinge seal. An extension on the hinge seal sealingly overlays the recessed area in the divergent flap. The hinge seal extension has an arcuate edge which conforms to the boundary of the recess surface and the flap.

The axis of the first and second pivotable connections intersect at right angles. The first connection is formed of two spaced coaxial pins with a space therebetween. The second pivotable connection comprises a pin located in that space.

DESCRIPTION OF THE PREFERRED EMBODIMENT

Figure 1:
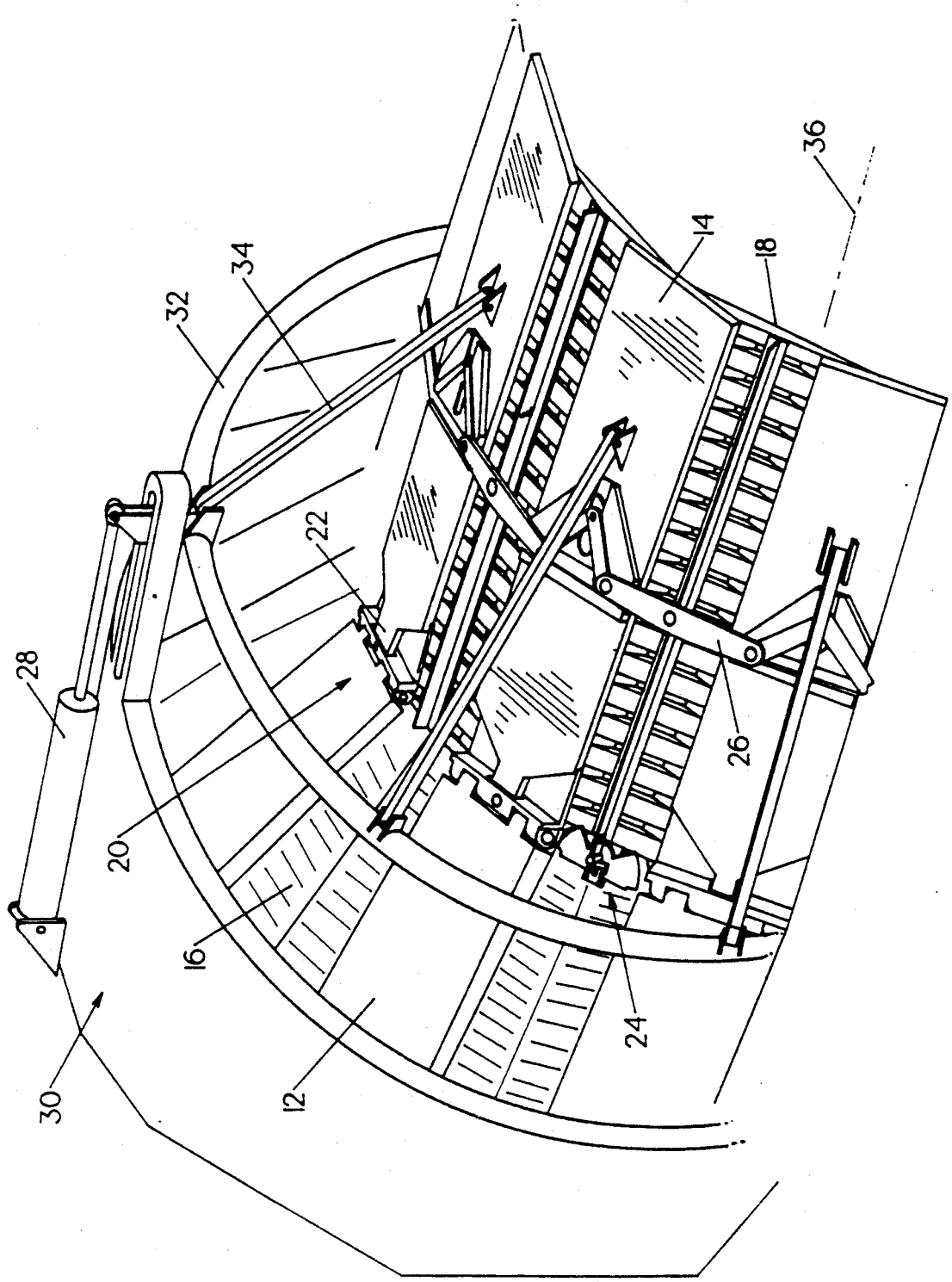
FIG. 1 is a partial isometric view of the convergent/divergent nozzle.

FIG. 1 is a general view of convergent/divergent nozzle 10 with convergent flaps 12 and divergent flaps 14. Interposed between the flaps are convergent seals 16 and divergent seals 18.

Convergent and divergent flap hinge assembly 20 includes a divergent flap hinge seal 22. This divergent flap hinge seal overlaps divergent flap 14.

Convergent to divergent seal hinge 24 joins the convergent and divergent seals. Divergent seal centering and restraining arrangement 26 centers and restrains the divergent seals 18.

Conventional drives may be used to vary the angular position of convergent flaps 12 and convergent seals 16, thereby varying the throat opening of the nozzle. Actuator 28 operating against the static upstream structure 30 drives a sync ring 32. This sync ring is connected through drive links 34 to the divergent flaps 14. By translating ring 32 rearwardly, the exit opening is reduced. By tilting the sync ring 32, the flaps 14 are vectored with relation to the nozzle axis 36 to achieve a vectoring discharge of the nozzle.

Figure 2:
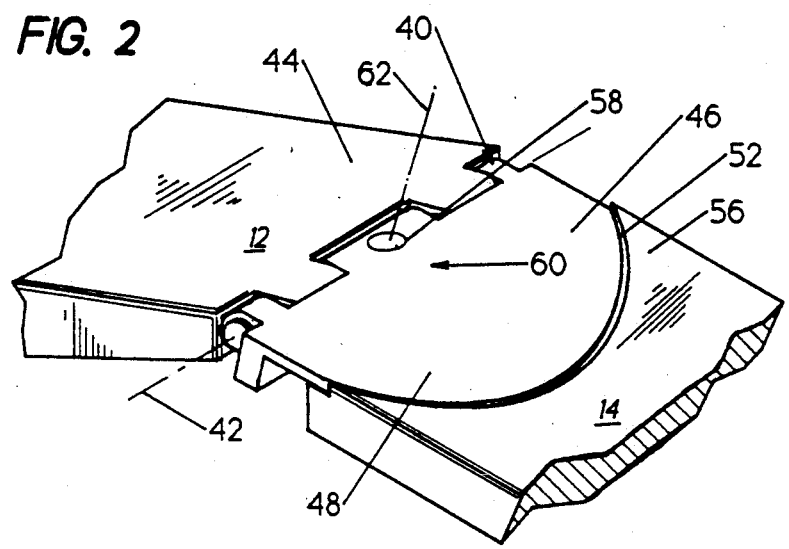
FIG. 2 is an isometric view of the hinge area.
Figure 3:
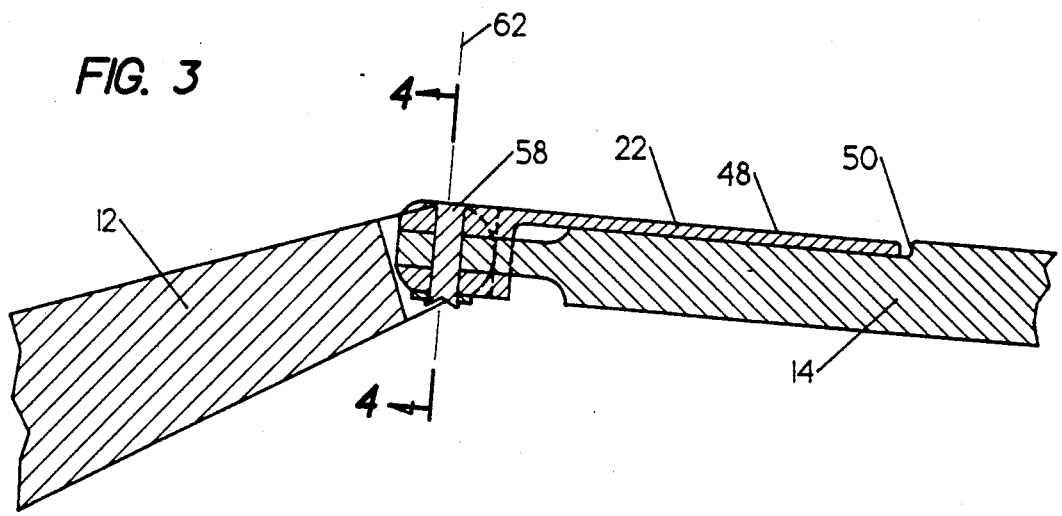
FIG. 3 is a section through the hinge area.

Referring to FIGS. 2 and 3, the hinge connection between convergent flap 12 and divergent flap 14 is shown. The divergent flap hinge seal is pivotably connected to convergent flap 12. The first pivotable connection 40 has its axis 42 parallel to the planar gas surface 44 of the convergent flap and the planar gas surface 46 of the divergent flap hinge seal 22.

The seal extension 48 sealingly overlays recess 50 of the divergent flap 14. It has an arcuate edge 52 with boundary 54 of the recess conforming to the arcuate edge. The center of curvature of the axis is through pin 58.

The planar gas side surface 56 of divergent flap 14 is coplanar with the gas side surface 46 of the divergent hinge flap seal 22.

A second pivotable connection 60 has an axis 62 perpendicular to planar surface 46 of the divergent flap hinge seal. This connects the hinge seal 22 and the divergent flap 14 through a radial hinge pin 58. The axis 42 of the first pivotable connection and the axis 62 of the second pivotable connection are perpendicular to each other.

Figure 4:
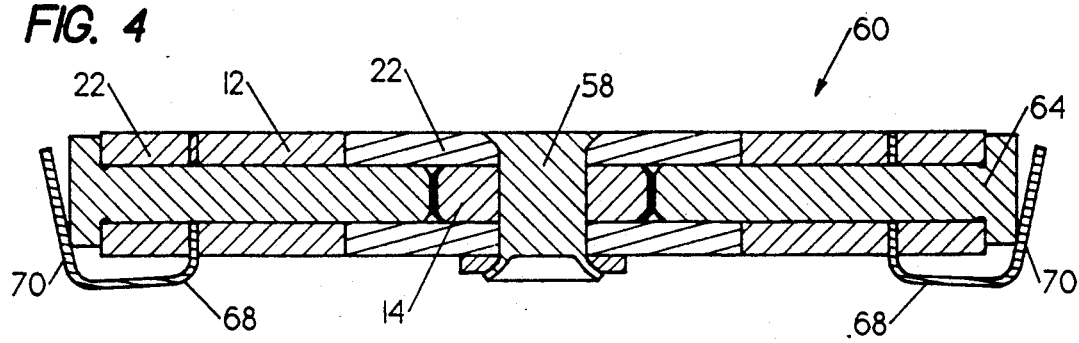
FIG. 4 is a section through the hinge along 4—4 of FIG. 3.
Figure 5:
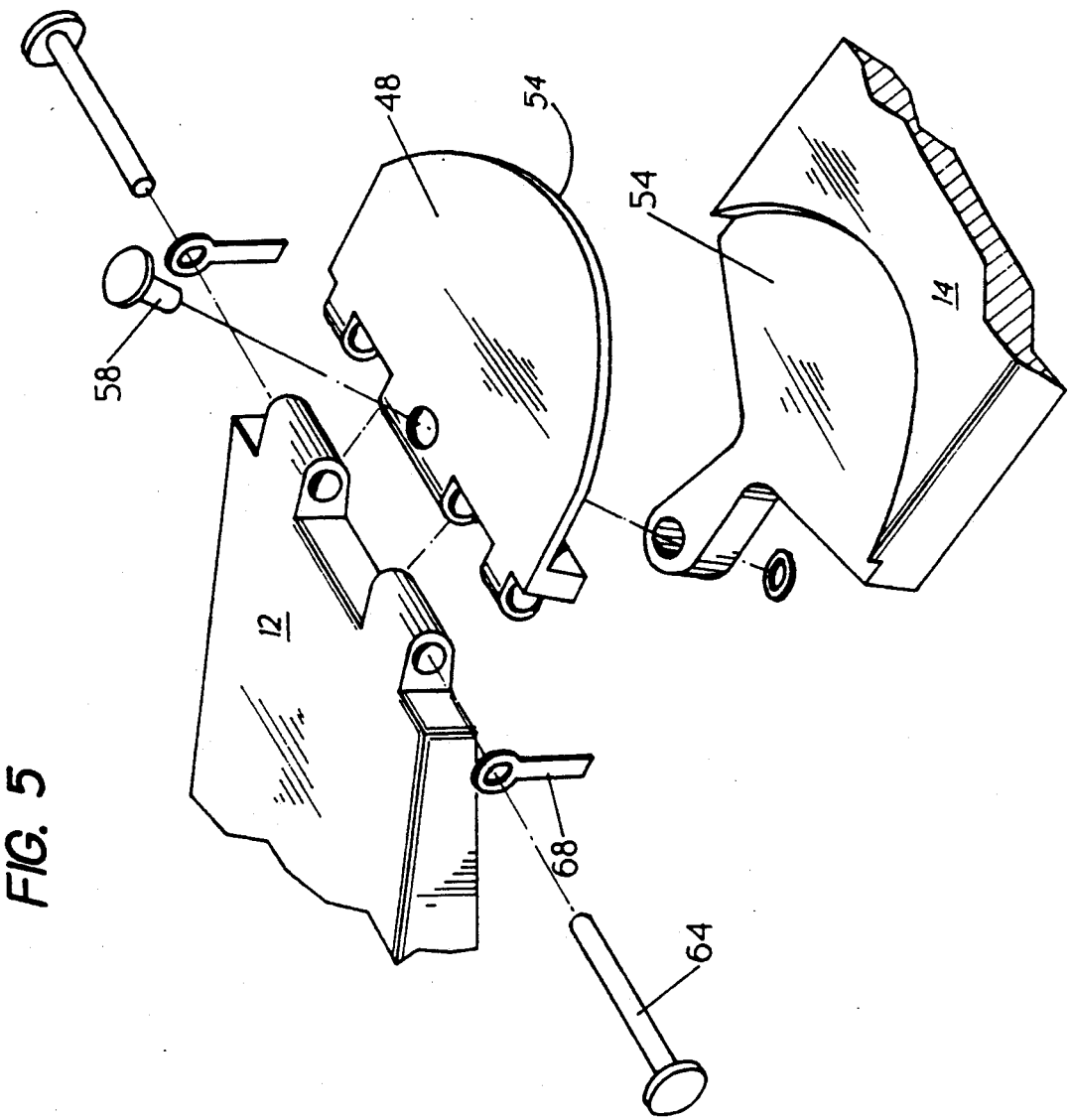
FIG. 5 is an exploded view of the hinge arrangement.

As seen in FIG. 4, the second pivotable connection 60 is formed of two spaced pins 64 with the space in between. The radial hinge pins 64 with the in the space between pin 64. Hinge pin retainers 68 are placed on the pins with tab 70 bent to hold the pins in place.

The convergent/divergent flaps are thereby connected allowing 2 degrees of freedom to make vectoring possible. Divergent flap hinge seal operates to seal the hinge during such vectoring operation. The smooth interior of the nozzle is maintained thereby not affecting the geometry of the nozzle throat nor blocking the cooling flow from the convergent liner.

I claim:

1. A flap hinge arrangement for an axisymmetric vectorable convergent/divergent nozzle comprising:
    a variable convergent flap having a planar gas side convergent flap surface;

a divergent flap hinge seal having a planar gas side flap hinge seal surface and pivotally connected to said convergent flap;

a variable divergent flap having a planar gas side divergent flap gas side surface coplanar with said planar gas side flap hinge seal surface; and a second pivotable connection having an axis perpendicular to said gas side flap hinge seal surface and connecting said flap hinge seal and said divergent flap.

2. A flap hinge arrangement as in claim 1 comprising also:

a recessed area on the gas side surface of said divergent flap adjacent to said second pivotable connection; and said flap hinge seal having an extension sealingly overlaying said recessed area.

3. A flap hinge arrangement as in claim 2 comprising also:

said extension having an arcuate edge with the center of curvature passing through said second pivotable connection.

4. A flap hinge arrangement as in claim 3 comprising also:

the boundary of said recessed area conforming to said arcuate edge.

5. A flap hinge arrangement as in claim 1 comprising also:

the axis of said second pivotable connection intersecting at a right angle.

6. A flap hinge arrangement as in claim 5 comprising also:

said first pivotable connection comprising two spaced coaxial pins with a space therebetween; and said second pivotable connection comprising a pin located in said space.

7. A flap hinge arrangement as in claim 2 comprising also:

the axis of said first pivotable connection and the axis of said second pivotable connection intersecting at a right angle.

8. A flap hinge arrangement as in claim 7 comprising also:

said first pivotable connection comprising two spaced coaxial pins with a space therebetween; and said second pivotable connection comprising a pin located in said space.

9. A flap hinge arrangement as in claim 4 comprising also:

the axis of said first pivotable connection and the axis of said second pivotable connection intersecting at a right angle.

10. A flap hinge arrangement as in claim 9 comprising also:

said first pivotable connection comprising two spaced coaxial pins with a space therebetween; and said second pivotable connection comprising a pin located in said space.

* * * * *